United States Patent
Zeitler et al.

(10) Patent No.: US 11,806,863 B2
(45) Date of Patent: Nov. 7, 2023

(54) CLAMP DEVICE, CLAMP JAW, AND CONTAINER-HANDLING APPARATUS

(71) Applicant: KRONES AG, Neutraubling (DE)

(72) Inventors: Felix Zeitler, Neutraubling (DE); Bernhard Heinze, Neutraubling (DE)

(73) Assignee: KRONES AG, Neutraubling (DE)

( * ) Notice: Subject to any disclaimer, the term of this patent is extended or adjusted under 35 U.S.C. 154(b) by 137 days.

(21) Appl. No.: 17/324,391

(22) Filed: May 19, 2021

(65) Prior Publication Data
US 2021/0362350 A1    Nov. 25, 2021

(30) Foreign Application Priority Data

May 20, 2020   (DE) ................... 10 2020 113 599.8

(51) Int. Cl.
*B25J 15/04*    (2006.01)

(52) U.S. Cl.
CPC ....... *B25J 15/0475* (2013.01); *B25J 15/0408* (2013.01)

(58) Field of Classification Search
CPC ..... B25J 15/0475; B25J 15/0408; B25J 3/242
USPC ................................ 294/86.4, 99.1
See application file for complete search history.

(56) References Cited

U.S. PATENT DOCUMENTS

| | | | | |
|---|---|---|---|---|
| 4,621,409 A | * | 11/1986 | Weixel | B23Q 3/15553 483/69 |
| 4,676,541 A | * | 6/1987 | Lord | B25J 15/0475 294/90 |
| 7,625,029 B2 | * | 12/2009 | Jenkins | A45F 5/1026 294/159 |
| 10,265,863 B2 | * | 4/2019 | Corkum | B25J 15/04 |
| 10,549,432 B2 | * | 2/2020 | Yokoyama | B25J 15/0475 |
| 2009/0315281 A1 | * | 12/2009 | Tuauden | B25J 15/0475 279/142 |
| 2010/0282364 A1 | | 11/2010 | Balzarin | |
| 2016/0355354 A1 | | 12/2016 | Fahldieck | |
| 2019/0054634 A1 | * | 2/2019 | Haddadin | F16M 11/041 |

FOREIGN PATENT DOCUMENTS

| | | |
|---|---|---|
| CN | 108541210 A | 9/2018 |
| CN | 110802624 A | 2/2020 |
| CN | 106507658 | 9/2020 |
| DE | 226 826 A1 | 9/1985 |

(Continued)

OTHER PUBLICATIONS

Extended European Search Report dated Oct. 7, 2021 from corresponding European application No. 21174987.4, 8 pages.

(Continued)

*Primary Examiner* — Paul T Chin
(74) *Attorney, Agent, or Firm* — Haynes and Boone, LLP (57) ABSTRACT

A clamp device for retaining a container in a container-handling apparatus, for example for retaining a drinks container in a container-handling apparatus of a bottling plant, includes two clamp arms which can be moved relative to one another, wherein at least one clamp arm has an interchangeable clamp jaw with a retaining portion for retaining the container which is to be retained, wherein the clamp jaw has a latching element for undergoing a form fit with a recess formed in the associated clamp arm. A clamp jaw and a container-handling apparatus are also described.

19 Claims, 9 Drawing Sheets

(56) References Cited

FOREIGN PATENT DOCUMENTS

| | | |
|---|---|---|
| DE | 203 05 988 U1 | 7/2003 |
| DE | 10 2007 048 861 A1 | 4/2009 |
| DE | 10 2014 101 959 A1 | 8/2015 |
| DE | 10 2017 105 024 A1 | 9/2018 |
| JP | 2013091121 A | 5/2013 |
| WO | WO 03/078285 A1 | 9/2003 |
| WO | WO 2019/137891 A1 | 7/2019 |

OTHER PUBLICATIONS

Office Action for Chinese Application No. 202110546532.5 dated Sep. 13, 2022, 9 pages.

* cited by examiner

CLAMP DEVICE, CLAMP JAW, AND CONTAINER-HANDLING APPARATUS

CROSS-REFERENCE TO RELATED APPLICATIONS

This application claims priority from German Patent Application No. DE 10 2020 113 599.8, filed on May 20, 2020 in the German Patent and Trademark Office, the disclosure of which is incorporated herein by reference in its entirety.

BACKGROUND

Technical Field

The present invention relates to a clamp device for retaining a container in a container-handling apparatus, for example for retaining a drink container in a container-handling apparatus of a bottling plant, and to a clamp jaw for a clamp arm of a clamp device for retaining a container in a container-handling apparatus, and to a container-handling apparatus.

Related Art

It is known in bottling plants for the containers which are to be handled therein to be transported through individual handling stations of a container-handling apparatus by means of clamp devices. Such clamp devices have two clamp arms which can be moved relative to one another and can be moved between an open position, in which a container which is to be retained can be positioned between the clamp arms, and a closed position, in which the container positioned between the clamp arms can be retained by the clamp arms.

For the purpose of retaining the container, each clamp arm has a retaining portion, by way of which the clamp arm comes into contact with the container in order to retain the latter. The constant contact with the retained containers gives rise to the retaining portion being subjected to gradual wear. In order to take account of this wear, and to make it possible for different types of containers to be able to be retained and transported by the same clamp device, it is known for the clamp arms to be provided with interchangeable clamp jaws each equipped with a retaining portion associated with the respective clamp arm, as can be gathered for example from DE 10 2007 048 861 A1.

Therefore, in the event of a handling changeover from one type of container to another type of container, all that is required is for the clamp device to have its clamp jaws changed over. The remaining parts of the clamp device, in particular the clamp arms, can remain permanently on the handling apparatus, for example on the clamp carrier thereof.

For the purpose of fastening the clamp jaw on a clamp arm, it is known for the clamp arm to have a locking unit for locking the clamp jaw on the clamp arm, as can be gathered for example from DD 226 826 A1. This known configuration results in a large amount of effort being involved to manufacture the clamp arms, since the locking unit has to be mounted and fastened on, for example screwed or welded to, the clamp arms. On the one hand, providing the locking unit on the clamp arm increases the complexity of the latter. On the other hand, a clamp arm provided with the locking unit requires effort to clean, on account of the locking unit, and in addition, in the event of a defect being found, is difficult to change over, in particular if provision is made for the clamp arm to remain fixed on the clamp carrier of the handling apparatus, as is the case for example with apparatuses for rinsing containers, so-called "rinsers".

SUMMARY

An improved clamp device for retaining a container in a container-handling apparatus, in particular for retaining a drink container in a container-handling apparatus of a bottling plant, is provided herein.

A clamp device for retaining a container in a container-handling apparatus, for example for retaining a drink container in a container-handling apparatus of a bottling plant, is also provided herein. Advantageous developments can be gathered from the description and the figures.

Accordingly, the invention proposes a clamp device for retaining a container in a container-handling apparatus, for example for retaining a drink container in a container-handling apparatus of a bottling plant, comprising two clamp arms which can be moved relative to one another, wherein at least one clamp arm has an interchangeable clamp jaw with a retaining portion for retaining the container which is to be retained. The clamp device is characterized in that the clamp jaw has a latching element for undergoing a form fit with a recess formed in the associated clamp arm.

Since the clamp jaw has a latching element for undergoing a form fit with a recess formed in the associated clamp arm, it is no longer necessary for the clamp arm to be provided with a dedicated locking unit for fixing the interchangeable clamp jaw on the clamp arm. Accordingly, the clamp arm can have a more straightforward construction. It is likewise possible, as result, to achieve more straightforward manufacture of the clamp arm and also of the clamp device, because for example welding and subsequent pickling and/or electropolishing can be dispensed with.

It is also possible for the clamp jaw to be changed over more easily than is the case for conventional clamp devices. For the purpose of changing over a clamp jaw, the service technician needs to grip the clamp jaw. In order to do this, he will be in the immediate vicinity of the clamp jaw. Since the clamp jaw has the latching element, there is no need for the service technician to grip any other location of the clamp device in order to release the locking in relation to the clamp arm; rather, he only has to grip the latching element, and therefore the clamp jaw, which is necessary in any case. This means that it is also possible for a clamp jaw to be changed over, or removed and also mounted, for example using just one hand, and this can achieve considerably simplified and, at the same time, also more reliable handling of the clamp jaw.

According to a further embodiment, the latching element comprises an elastically deformable region, for example an extension arm. It has been found, in particular, to be advantageous here to form the latching element in the manner of a snap-in hook.

If the latching element comprises an interaction segment for the purpose of releasing the form fit, actuation of the interaction element can straightforwardly make it possible for the locking of the clamp jaw on the clamp arm to be released and therefore for the clamp jaw to be removed from the clamp arm.

In order to make it easier for the clamp jaw to be pushed onto the clamp arm, the latching element can comprise a chamfer portion inclined in relation to a push-on direction, in which the clamp jaw can be pushed onto the associated clamp arm.

According to a further embodiment, the clamp jaw comprises a mount which extends in the push-on direction, in which the clamp jaw can be pushed onto the associated clamp arm, and is intended for receiving a plug-on region of the associated clamp jaw. The mount makes it possible to position the clamp jaw relative to the clamp arm in a direction perpendicular to the push-on direction.

The clamp jaw generally has at least one clamping extension, which extends from an inner wall of the mount in a direction perpendicular to the push-on direction. The clamping extension here is typically designed such that a distance which is present between the clamping extension and an opposite inner wall of the mount is smaller by a predefined value, for example by a scaling factor of 0.9 to 0.99, than a width of the clamp arm or of the plug-on region in the direction of the aforementioned distance. This means that the plug-on region of the clamp arm can be subjected to a predetermined clamping force by the clamp jaw such that the clamp jaw is positioned in a stable manner on the clamp arm. It has been found to be particularly advantageous if at least two clamping extensions are provided in the mount. In some embodiments, two clamping extensions are located opposite one another and/or at least two clamping extensions are oriented at 90° in relation to one another.

It has been found to be particularly advantageous if the clamp jaw is formed in one piece, for example as a 3D printed part. In particular, the latching element here is formed in one piece with the rest of the clamp jaw.

According to a further embodiment, at least one clamp arm, for example at least the clamp arm provided with the clamp jaw, is designed in the form of an injection moulding.

As an alternative, or in addition, at least one clamp arm, for example at least the clamp arm provided with the clamp jaw, is formed from a cut-out shaped metal sheet, wherein the shaped metal sheet is generally formed from a blank cut out of a planar metal sheet, wherein the blank is typically formed by means of bending, thermoforming, cold working and/or hot working.

The blank is generally cut out of the planar metal sheet by means of water jet cutting, punching, laser cutting or sawing.

According to a further embodiment, at least one clamp arm, for example the clamp arm provided with the clamp jaw, comprises a thermoplastic material or a metal or a metal alloy. The aforementioned materials are suitable, in particular, for the manufacturing processes described above.

It has been found to be advantageous if the clamp jaw comprises a plastic material, the clamp jaw generally consisting thereof.

As an alternative, the clamp jaw can also comprise a metal or a metal alloy, the clamp jaw generally consisting of the metal or the metal alloy.

According to a further embodiment, the two clamp arms each have a clamp jaw with a latching element for undergoing a form fit with a recess formed in the associated clamp arm.

Embodiments of the invention also propose a container-handling apparatus, comprising a handling unit for handling a container and also comprising a clamp carrier. At least one clamp device according to one of the preceding embodiments is fitted on the clamp carrier.

Since at least one clamp device according to one of the preceding embodiments is fitted on the clamp carrier, the advantages and effects described in relation to the clamp device can be achieved in an analogous manner by the container-handling apparatus. The handling unit generally comprises a rinsing unit for rinsing a container. In other words, the container-handling apparatus typically constitutes a rinser.

The advantages and effects described in relation to the clamp device can be achieved in an analogous manner by a clamp jaw.

The embodiments of the clamp jaw which are described in relation to the clamp device also apply to the clamp jaw in itself.

Accordingly, the invention proposes an interchangeable clamp jaw for a clamp arm of a clamp device for retaining a container in a container-handling apparatus, for example a clamp device for retaining a drink container in a bottling plant, comprising a retaining portion for retaining the container which is to be retained. The clamp jaw also has a latching element for undergoing a form fit with a recess formed in the clamp arm.

BRIEF DESCRIPTION OF THE FIGURES

Further embodiments of the invention will be explained in more detail by the following description of the figures.

DETAILED DESCRIPTION

Exemplary embodiments will be described hereinbelow with reference to the figures. Identical, similar or equivalent elements are denoted in the different figures by identical reference signs, and a repeated description of these elements is dispensed with in some cases in order to avoid redundancies.

Figure 1:
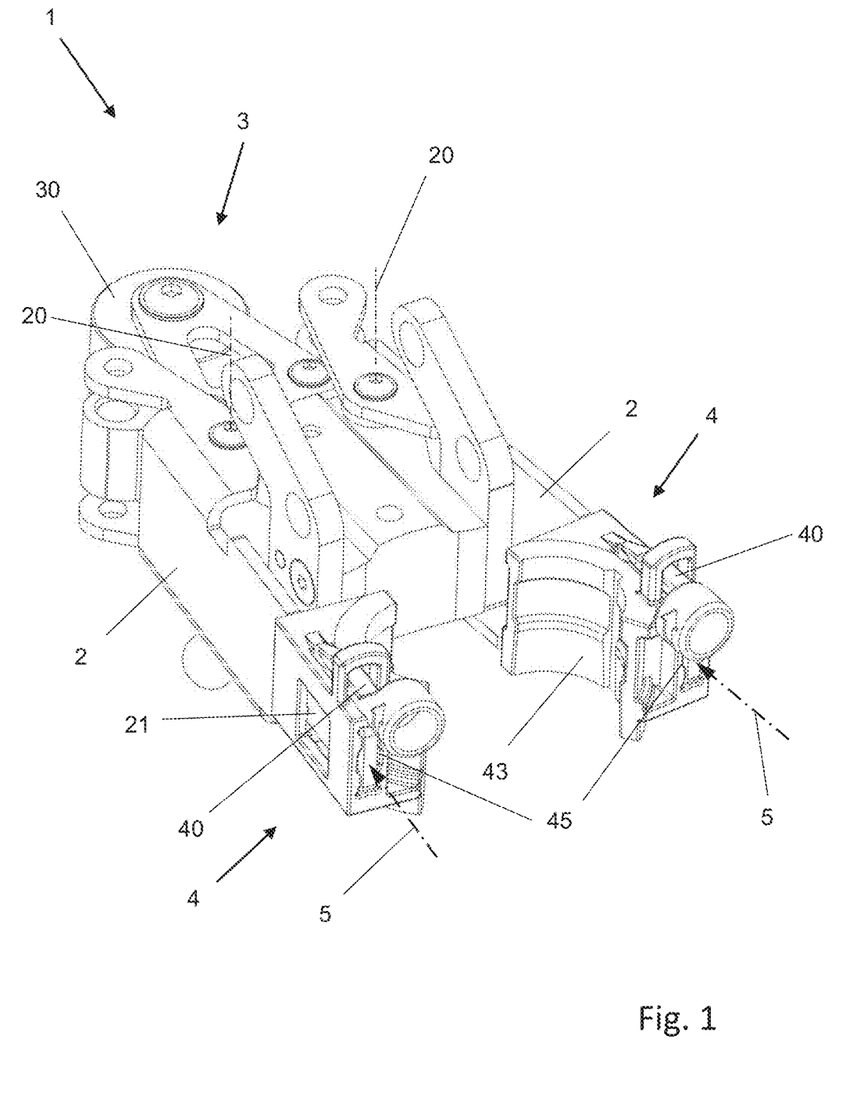
FIG. 1 shows, schematically, a perspective side view of a clamp device for retaining a container.

FIG. 1 shows, schematically, a perspective side view of a clamp device 1 for retaining a container. The clamp device 1 comprises two clamp arms 2 which can be moved relative to one another and are each arranged on a central clamp-arm carrier 3 such that they can be pivoted about a respective pivot axis 20. Actuation of an actuating element 30 of the clamp-arm carrier 3 allows the clamp arms 2 to be pivoted between an open position and a closed position.

Each of the two clamp arms 2 has an interchangeable clamp jaw 4, which has a respective retaining portion 43 for retaining the container which is to be retained. The clamp jaws 4 are pushed onto the clamp arms 2 by the clamp jaw 4 being plugged in a push-on direction 5 onto a plug-on region 21 of the associated clamp arm 2, or the plug-on region 21 is pushed in the push-on direction 5 into a mount 45, which is provided on the clamp jaw 4.

Figure 2:
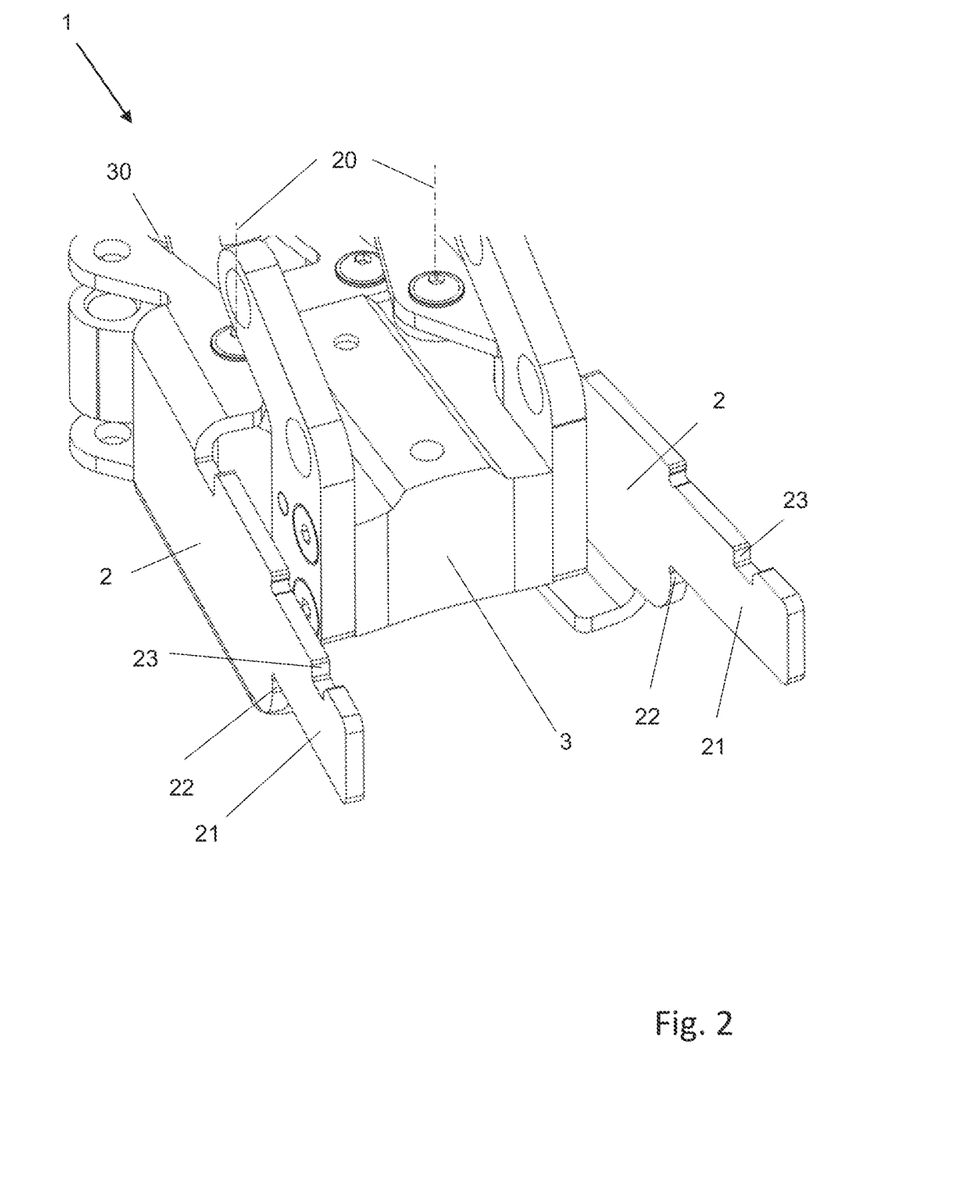
FIG. 2 shows, schematically, a further perspective side view of the clamp device from FIG. 1.
Figure 3:
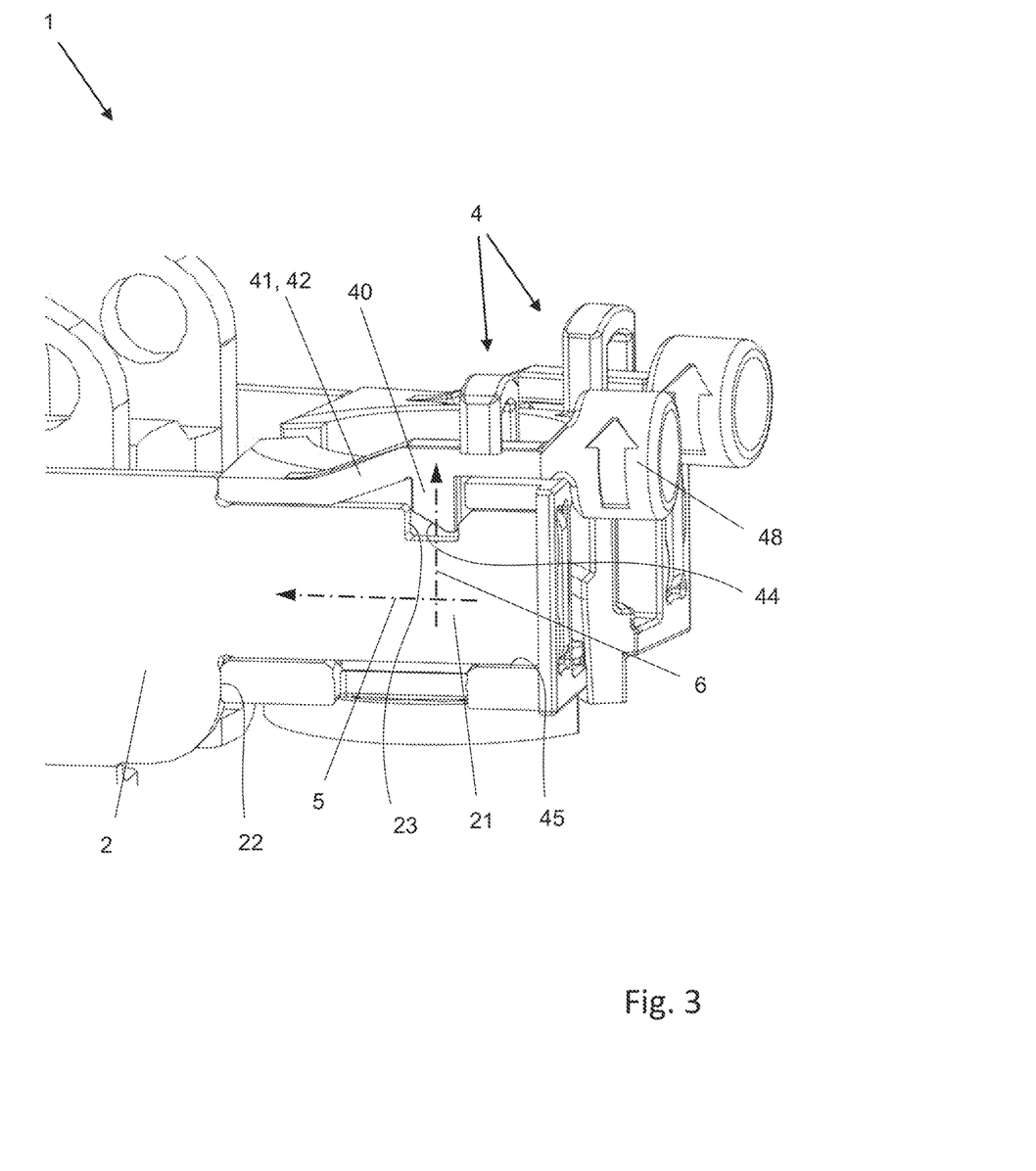
FIG. 3 shows, schematically, a sectional view through a clamp arm of the clamp device from FIGS. 1 and 2.

The clamp jaws 4 each have a latching element 40 for undergoing a form fit, in the push-on direction 5, with a recess formed in the associated clamp arm 2 (see FIGS. 2 and 3).

FIG. 2 shows, schematically, a further perspective side view of the clamp device 1 from FIG. 1, wherein the clamp jaws 4 have been removed from the clamp arms 2. This makes it possible to see, for each of the clamp arms 2, the recess 23, which is arranged in the plug-on region 21. It is also possible to see a stop 22, which limits the movement of the clamp jaw 4 being pushed onto the clamp arm 2 in the push-on direction 5.

FIG. 3 shows, schematically, a sectional view through a clamp arm 2 of the clamp device 1 from FIGS. 1 and 2. The latching element 40 comprises an extension arm 42, which extends from the main body of the clamp jaw 4 and constitutes an elastically deformable region 41. The latching element 40 also comprises an interaction segment 48, which can be actuated to raise the extension arm 42 in an opening direction 6 arranged in a direction perpendicular to the push-on direction 5, in which case the latching element 40 is disengaged from the recess 23 and the clamp jaw 4 can thus be removed from the clamp arm 2.

As will be explained in more detail with reference to FIG. 6, the mount 45 of the clamp jaw 4 is designed such that the clamp jaw 4 is guided on the plug-on region 21 such that rotation is prevented, and in an essentially play-free manner in the direction of the push-on direction 5. As already mentioned above, the stop 22 limits the push-on movement of the clamp jaw 4.

In order to make it easier for the clamp jaw 4 to be pushed onto the plug-on region 21, the latching element 40 has a chamfer portion 44 inclined counter to the push-on direction 5.

Figure 4:
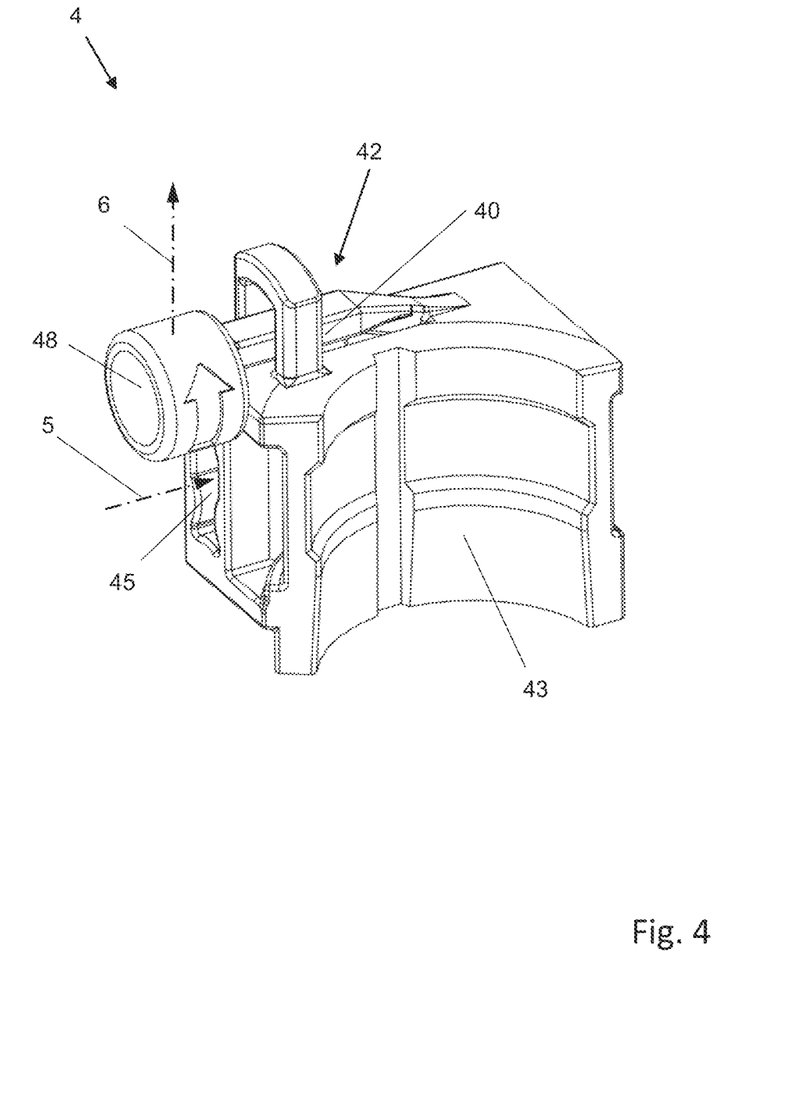
FIG. 4 shows, schematically, a perspective side view of a clamp jaw of the clamp device from FIGS. 1 to 3.
Figure 5:
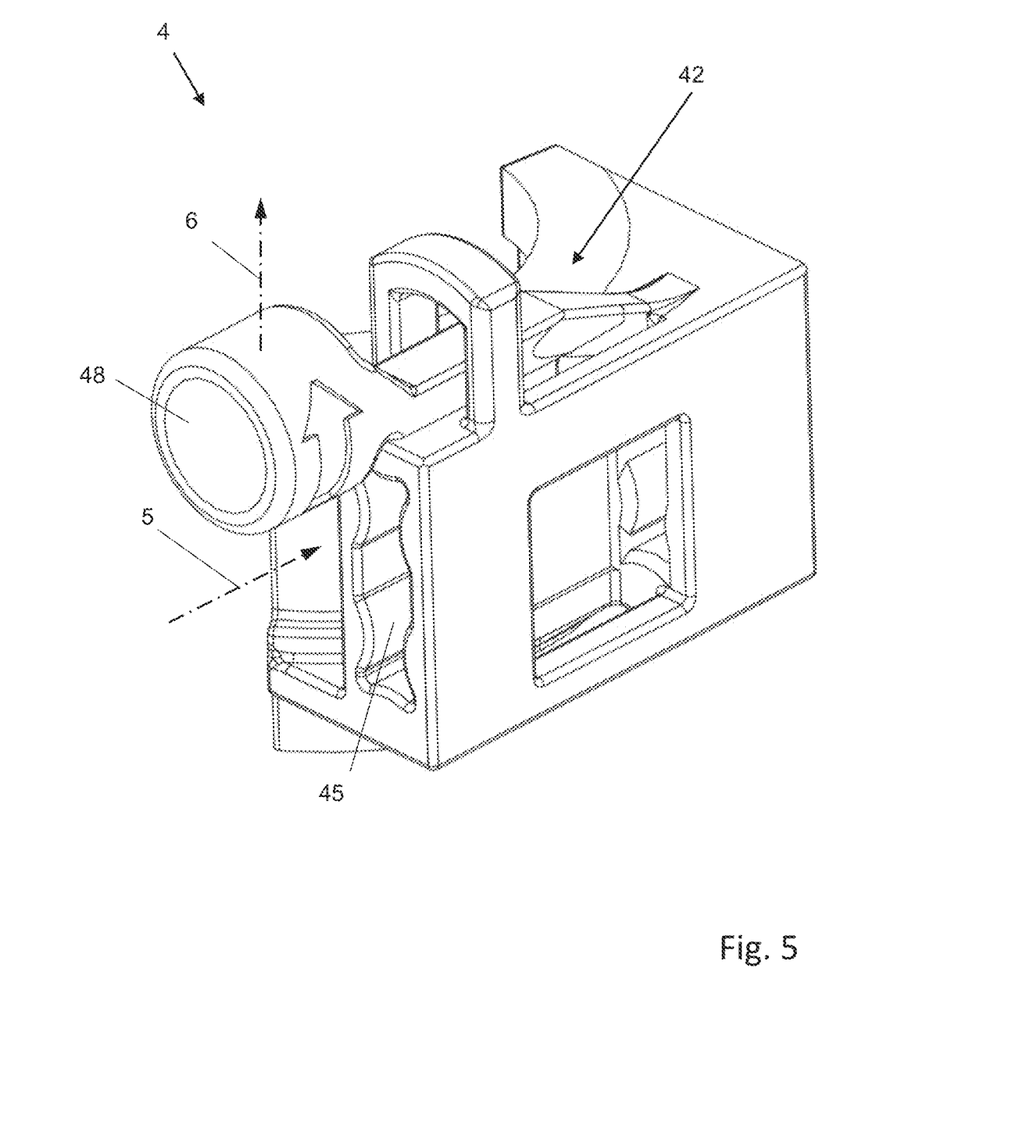
FIG. 5 shows, schematically, a perspective side view of a further clamp jaw of the clamp device from FIGS. 1 to 3.

FIGS. 4 and 5 illustrate perspective side views of the clamp jaws 4 of the two clamp arms 2 of the clamp device 1 from FIGS. 1 to 3. The clamp jaws 4 are designed in a mirror-symmetrical manner in relation to a centre axis of the clamp device and constitute a right-hand and a left-hand clamp jaw 4.

Figure 6:
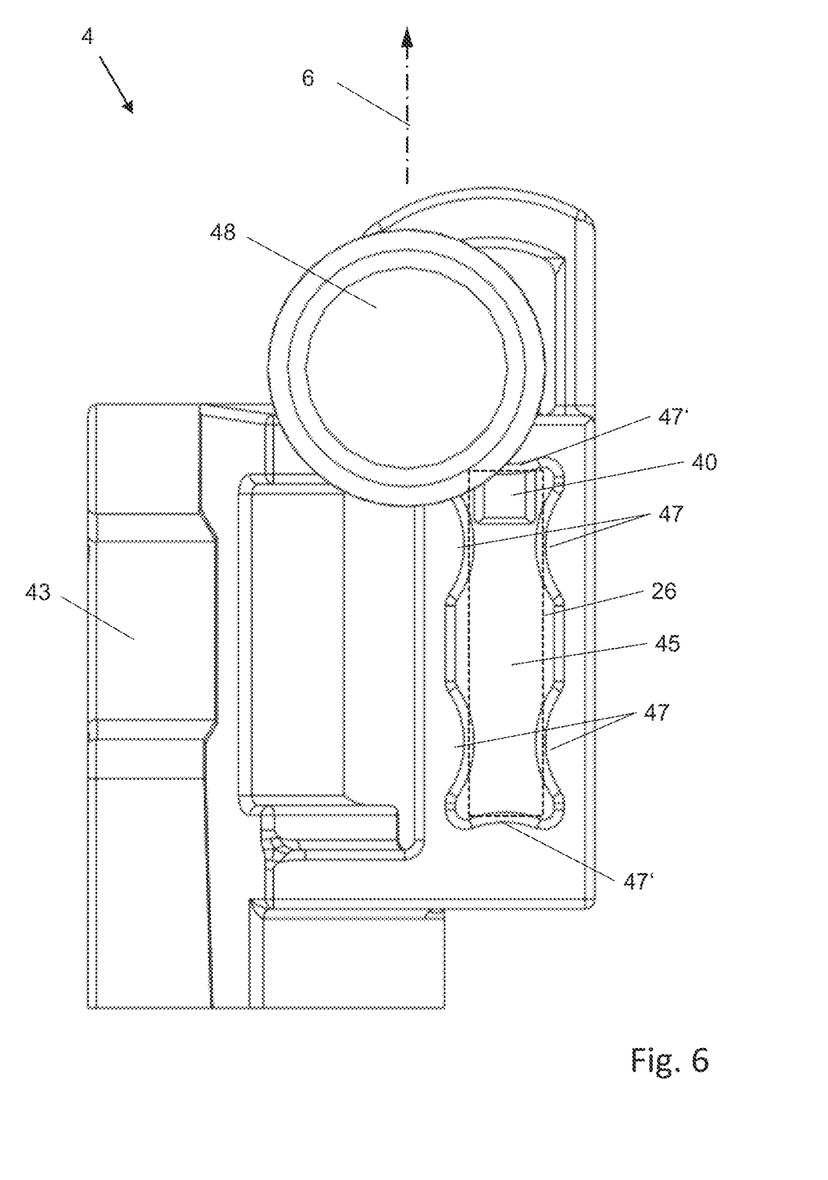
FIG. 6 shows, schematically, a side view of the clamp jaw from FIG. 5.

FIG. 6 shows, schematically, the clamp jaw 4 from FIG. 5 in a side view which corresponds to a view in the push-on direction 5. It can clearly be seen from this view that the mount 45 comprises clamping extensions 47, 47', which extend from the inner walls of the mount 45 in a direction perpendicular to the push-on direction 5. A respective pair of clamping extensions 47, 47' here are located opposite one another. The clamping extensions 47 delimit the width of the mount, whereas the clamping extensions 47' delimit the height of the mount.

Reference sign 26 denotes a cross-sectional contour of the plug-on region 21. The cross-sectional contour 26 has a width and a height which are each slightly greater than the width and height of the mount 45, these being predefined by the clamping extensions 47, 47'. The width and height of the mount 45 here are smaller, by a scaling factor of 0.98, than the width and the height of the plug-on region 21. This means that the clamp jaw 4 can subject the plug-on region 21 of the clamp arm 2 to a predetermined clamping force resulting from the stiffness of the material of the clamp jaw 4 and of the plug-on region 21, and from the difference in height and width which is present due to the scaling described above, and therefore the clamp jaw 4 is positioned in a stable manner on the clamp arm 2.

The clamp jaws 4 here are formed, from a thermoplastic material, as a 3D printed part.

Figure 7:
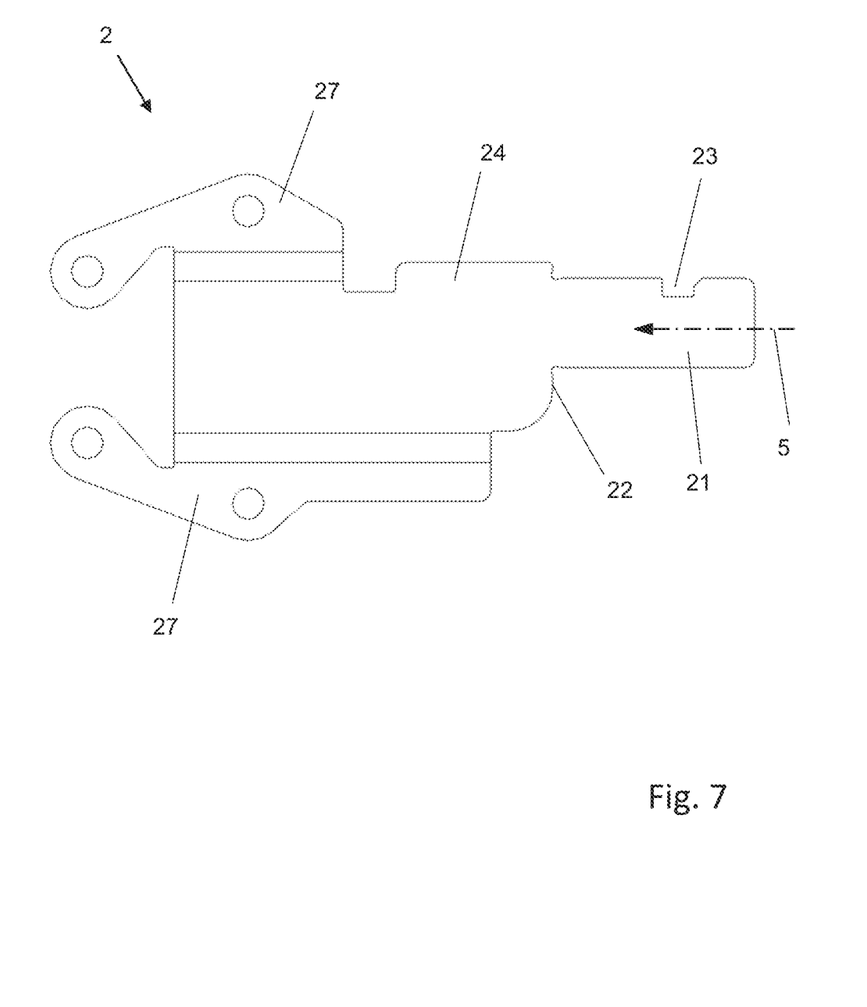
FIG. 7 shows, schematically, a plan view of a blank for producing a clamp arm of the clamp device according to FIGS. 1 to 3.

FIG. 7 shows, schematically, a plan view of a blank 24 for producing a clamp arm 2 of the clamp device 1 according to FIGS. 1 to 3. Laser cutting is used to detach the blank 24 from, or cut it out of, a planar metal sheet made of a steel alloy. The entire plug-on region 21 here, together with the recess 23 and stop 22, has already been cut to its end dimensions, as exhibited by the clamp arm 2 in the state in which it is installed in the clamp device 1, within a predefined tolerance range, and this means that, with the exception of an optional step for deburring the cut edge, for example a sand-blasting process, the plug-on region 21 does not require any further treatment.

Figure 8:
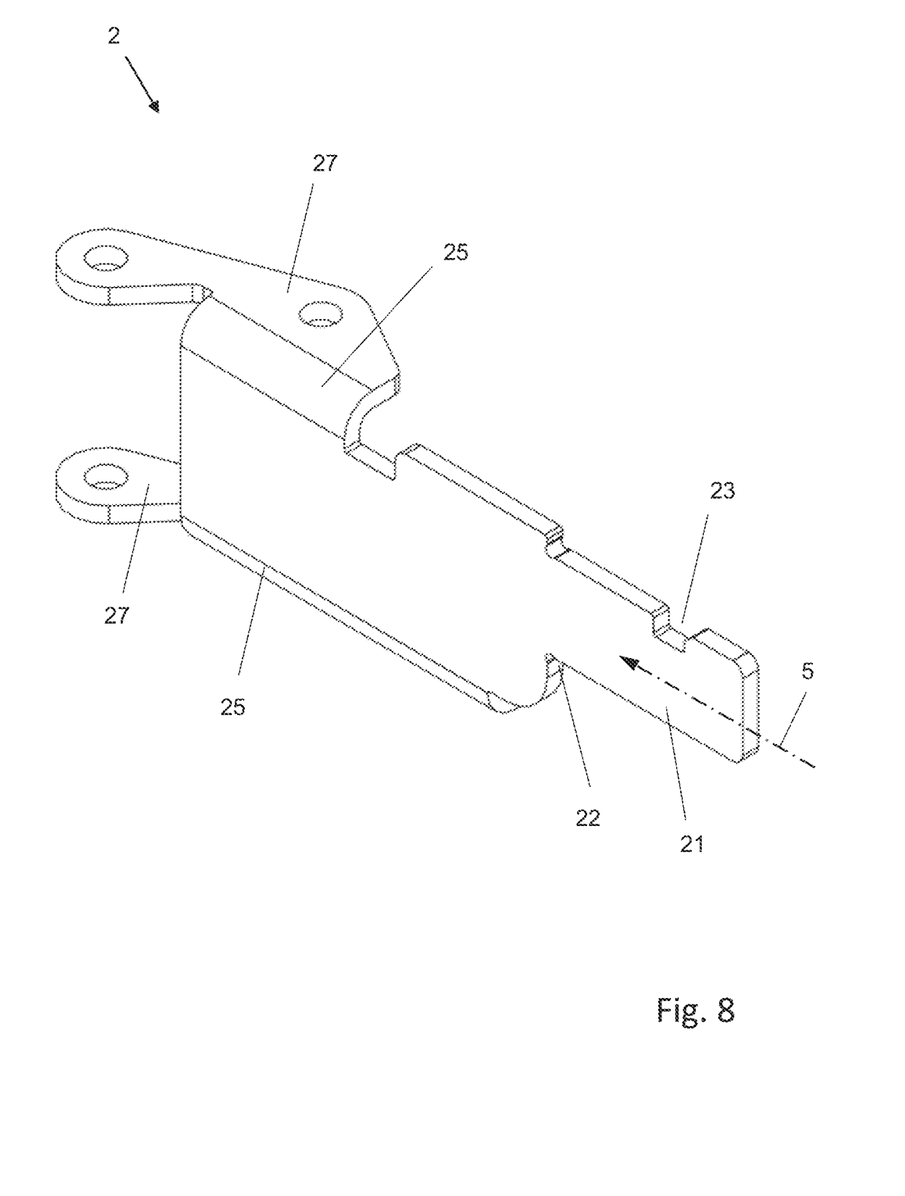
FIG. 8 shows, schematically, a perspective side view of the clamp arm manufactured from the blank according to FIG. 7.

The definitive shape of the clamp arm 2 as illustrated in FIG. 8 is achieved by the blank 24 being subjected to a forming process, which in the present case took place by two bending regions 27 being bent, in each case around a bending edge 25.

In particular if a clamp arm 2 is formed from a thermoplastic material, it is also possible for the forming process to be a thermoforming process, wherein the blank 24 is heated up at least in the region of the bending edges 25, heat deformation therefore being possible before the bending regions 27 are subjected to the forming process.

Figure 9:
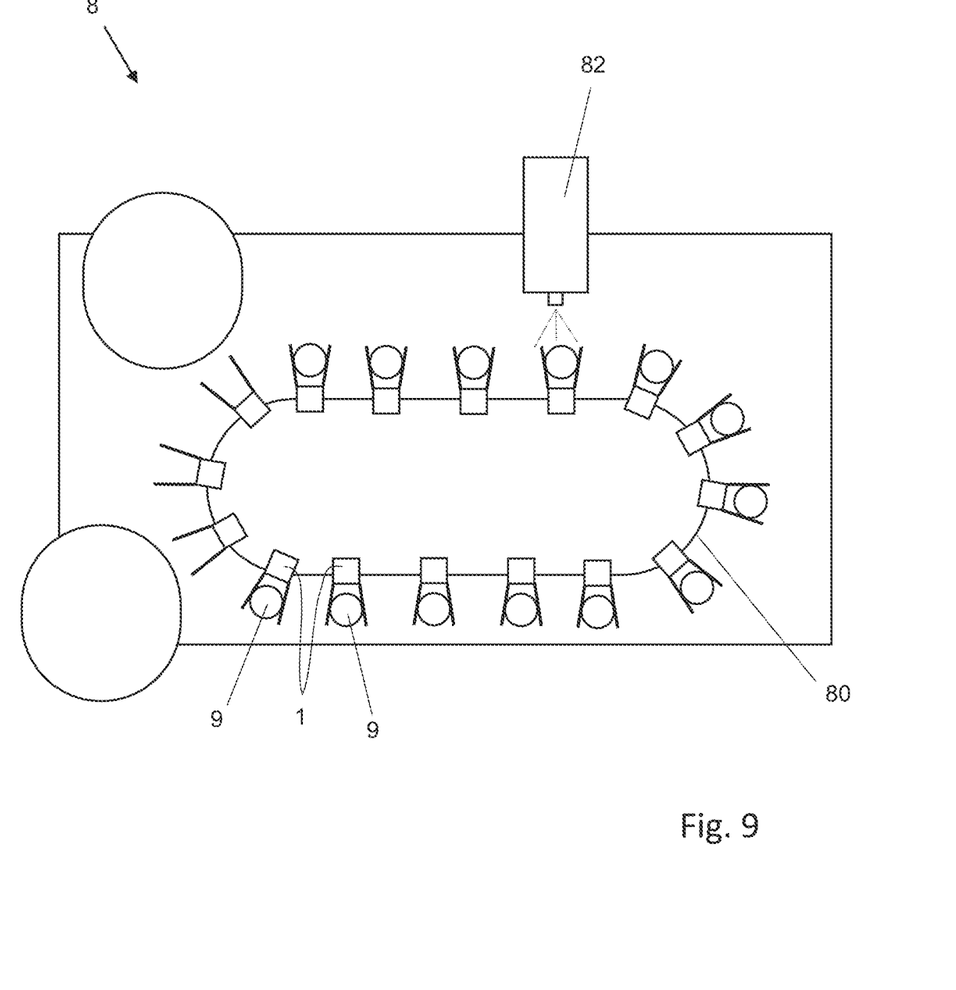
FIG. 9 shows, schematically, a plan view of a container-handling apparatus.

FIG. 9 shows, schematically, a plan view of a container-handling apparatus 8, comprising a handling unit 82 for handling containers 9 which are transported through the container-handling apparatus 8. For the purpose of transporting the containers 9 through the container-handling apparatus 8, the latter has a clamp carrier 80, which can be moved in a transporting direction 84 and on which a multiplicity of clamp devices 1 according to the embodiment described in FIGS. 1 to 8 are fitted.

The handling unit 82 here is designed in the form of a rinsing unit for rinsing the containers 9. The container-handling apparatus 8 therefore constitutes a rinser.

If applicable, all the individual features presented in the exemplary embodiments can be combined with one another and/or interchanged without departing from the scope of the invention.

What is claimed is:

1. An interchangeable clamp jaw for a clamp arm of a clamp device for retaining a container comprising:
    a retaining portion configured to retain the container; and
    a latching element configured to fit within a recess formed in the clamp arm, wherein:
    the latching element comprises a chamfer portion that is inclined counter to a push-on direction in which the interchangeable clamp jaw is configured to be pushed onto the clamp arm, and
    the interchangeable clamp jaw is formed as one piece.

2. The interchangeable clamp jaw of claim 1, wherein the latching element further comprises an elastically deformable region.

3. The interchangeable clamp jaw of claim 1, further comprising a mount that extends in a push-on direction in which the interchangeable clamp jaw is configured to be pushed onto the clamp arm.

4. The interchangeable clamp jaw of claim 3, further comprising at least one clamping extension that extends from an inner wall of the mount in a direction perpendicular to the push-on direction.

5. The interchangeable clamp jaw of claim 1, wherein the latching element further comprises an extension arm and an actuatable interaction segment configured to raise the extension arm in an opening direction that is perpendicular to the push-on direction.

6. A clamp device for retaining a container in a container-handling apparatus comprising:
two clamp arms configured to move relative to one another,
wherein:
a first clamp arm of the two clamp arms comprises an interchangeable clamp jaw with a retaining portion configured to retain the container,
the interchangeable clamp jaw comprises a latching element configured to fit in a recess formed in the first clamp arm,
the latching element comprises a chamfer portion that is inclined counter to a push-on direction in which the interchangeable clamp jaw is configured to be pushed onto the first clamp arm, and
the interchangeable clamp jaw is formed as one piece.

7. The clamp device of claim 6, wherein the latching element further comprises an elastically deformable region.

8. The clamp device of claim 6, wherein the interchangeable clamp jaw further comprises a mount that extends in a push-on direction in which the interchangeable clamp jaw is configured to be pushed onto the first clamp arm.

9. The clamp device of claim 8, wherein the mount is configured to receive a plug-on region of the first clamp arm.

10. The clamp device of claim 8, wherein the interchangeable clamp jaw further comprises at least one clamping extension that extends from an inner wall of the mount in a direction perpendicular to the push-on direction.

11. The clamp device of claim 6, wherein the one piece is a 3D printed part.

12. The clamp device of claim 6, wherein the first clamp arm is formed by injection moulding or is formed from a cut-out shaped metal sheet.

13. The clamp device of claim 12, wherein the shaped metal sheet is formed from a blank cut out of a planar metal sheet.

14. The clamp device of claim 13, wherein the blank is cut out of the planar metal sheet by water-jet cutting, punching, laser cutting, or sawing.

15. The clamp device of claim 6, wherein the first clamp arm further comprises a thermoplastic material, a metal, or a metal alloy, and/or the interchangeable clamp jaw further comprises a plastic material.

16. The clamp device of claim 6, wherein a second clamp arm of the two clamp arms comprises a clamp jaw with a latching element configured to fit within a recess formed in the second clamp arm.

17. A container-handling apparatus comprising:
a handling unit configured to handle a container; and
a clamp carrier, wherein the clamp device of claim 6 is fitted on the clamp carrier.

18. The container-handling apparatus of claim 17, wherein the handling unit comprises a rinsing unit configured to rinse the container.

19. The clamp device of claim 6, wherein the latching element further comprises an extension arm and an actuatable interaction segment configured to raise the extension arm in an opening direction that is perpendicular to the push-on direction.

* * * * *